No. 678,815. Patented July 16, 1901.
J. SCHMIDT, Jr.
BOX STAPLING MACHINE.
(Application filed Apr. 4, 1900.)
(No Model.) 5 Sheets—Sheet 1.
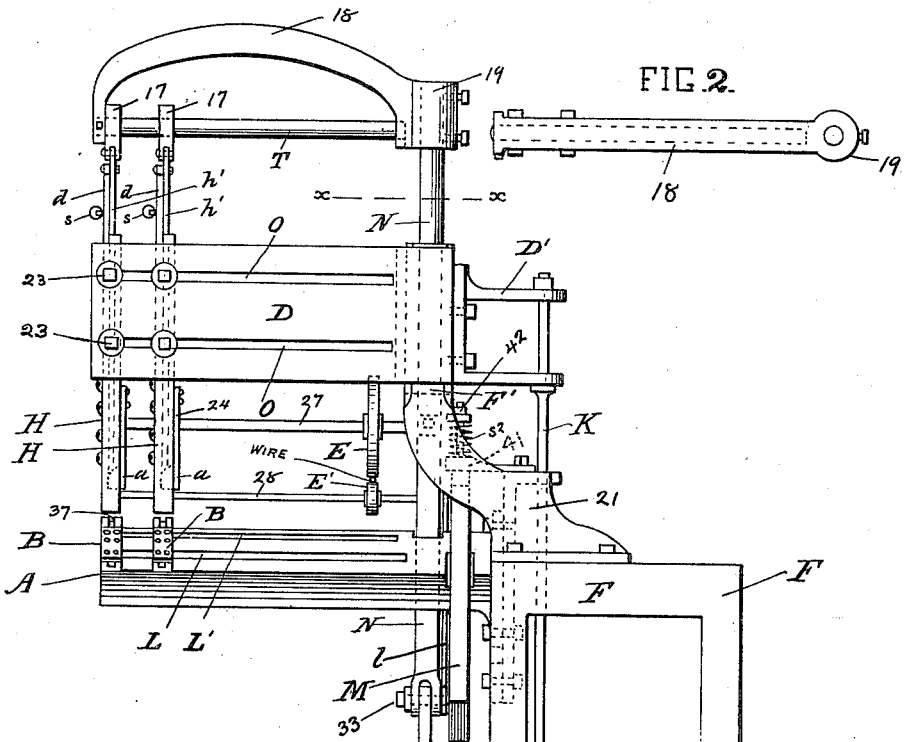
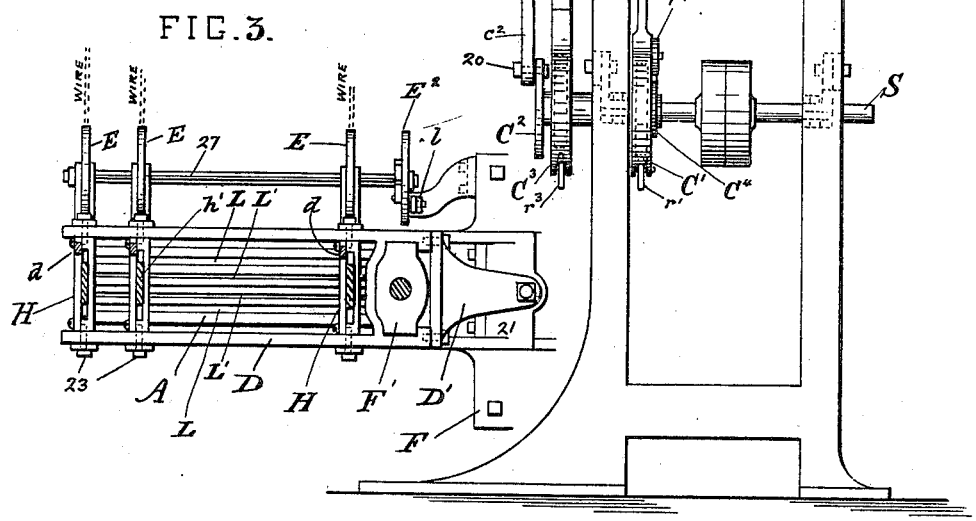
WITNESSES:
F. B. Townsend
H. D. Foley
INVENTOR.
J. Schmidt Jr.
BY L. B. Coupland & Co.
ATTORNEYS No. 678,815. Patented July 16, 1901.
J. SCHMIDT, Jr.
BOX STAPLING MACHINE.
(Application filed Apr. 4, 1900.)
(No Model.) 5 Sheets—Sheet 2.
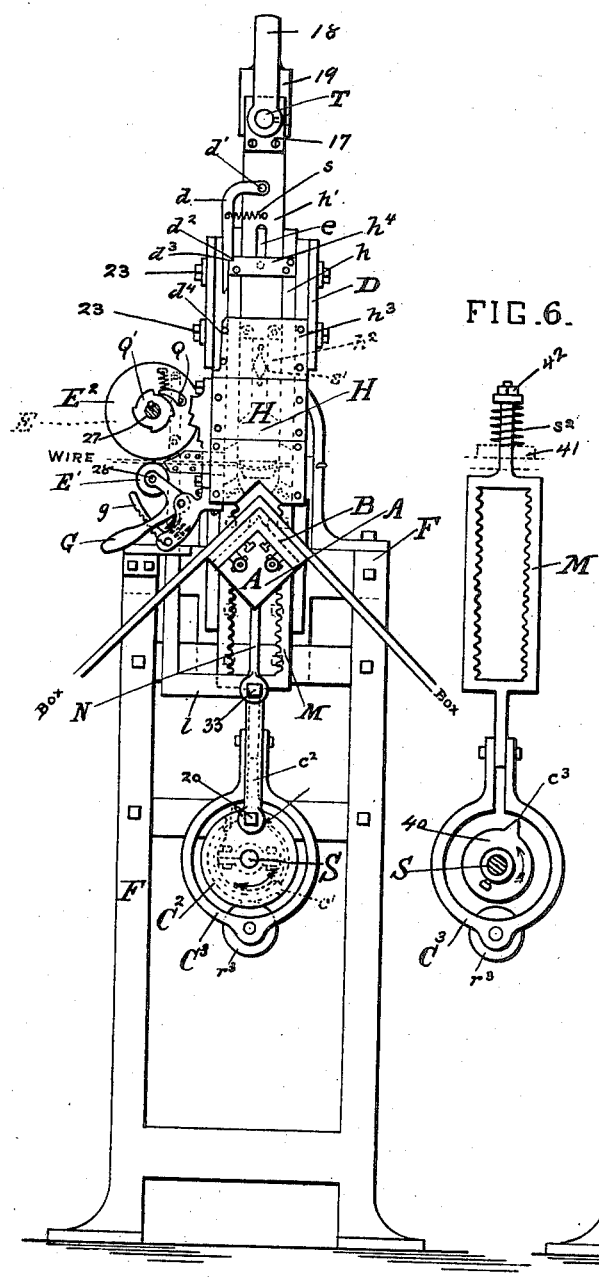
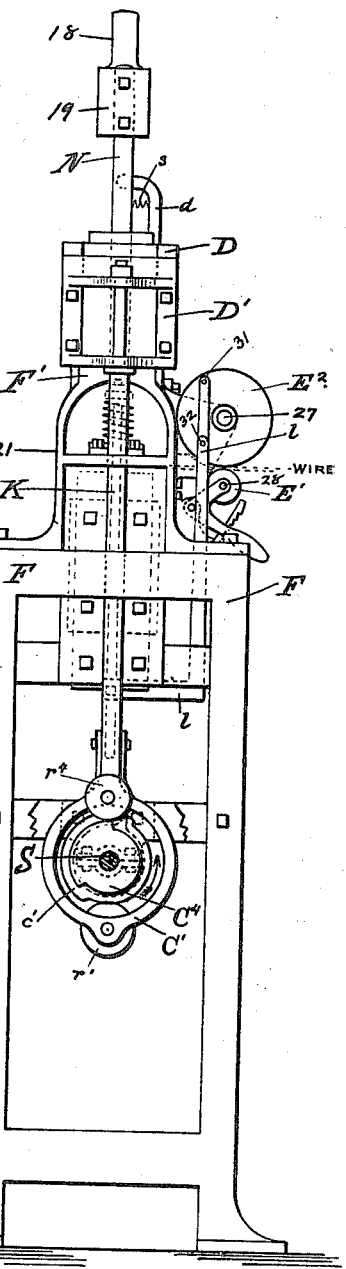
WITNESSES:
F. B. Townsend
H. D. Foley
INVENTOR.
J. Schmidt Jr.
BY L. B. Copeland
ATTORNEYS

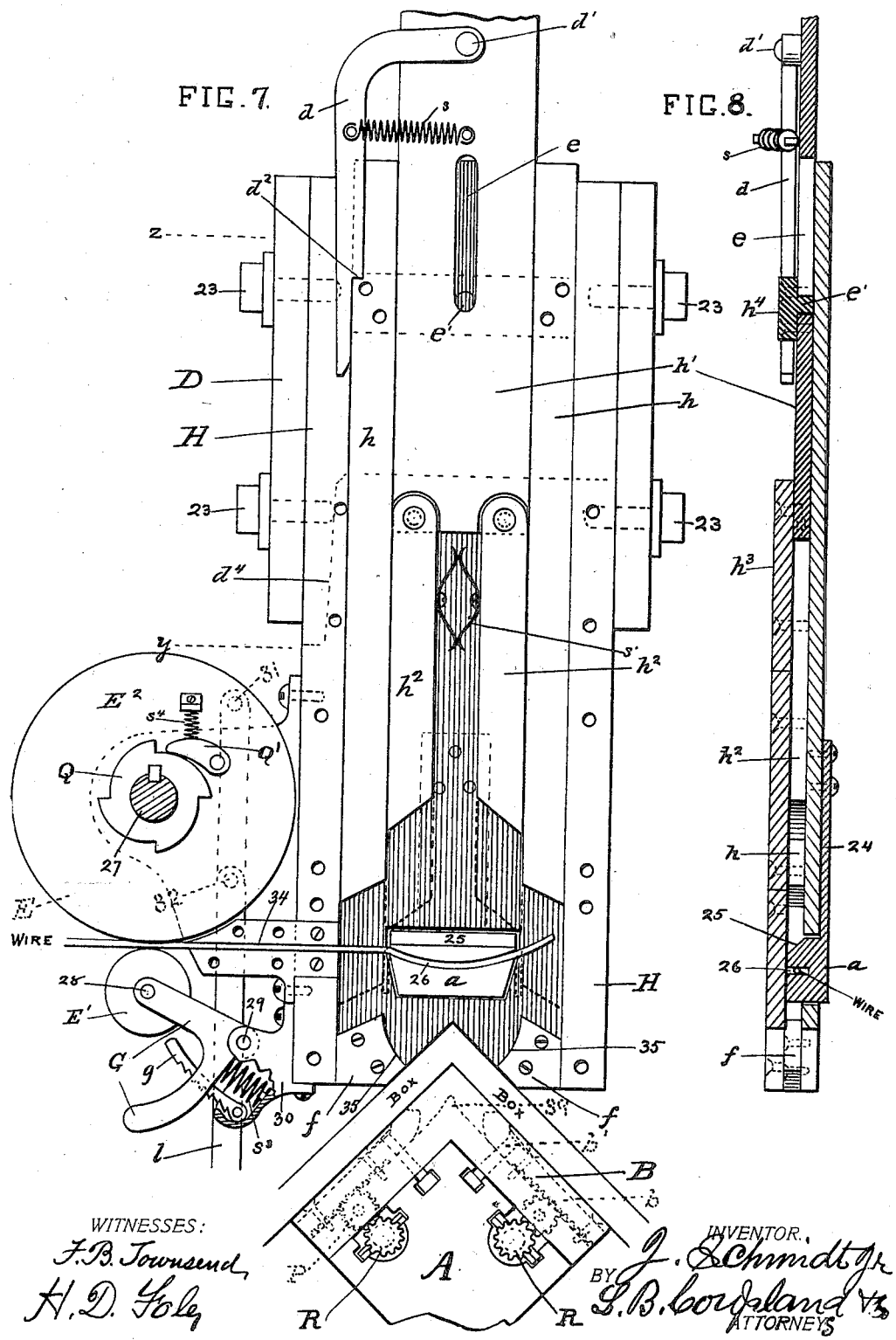

No. 678,815. Patented July 16, 1901.
J. SCHMIDT, Jr.
BOX STAPLING MACHINE.
(Application filed Apr. 4, 1900.)
(No Model.) 5 Sheets—Sheet 4.
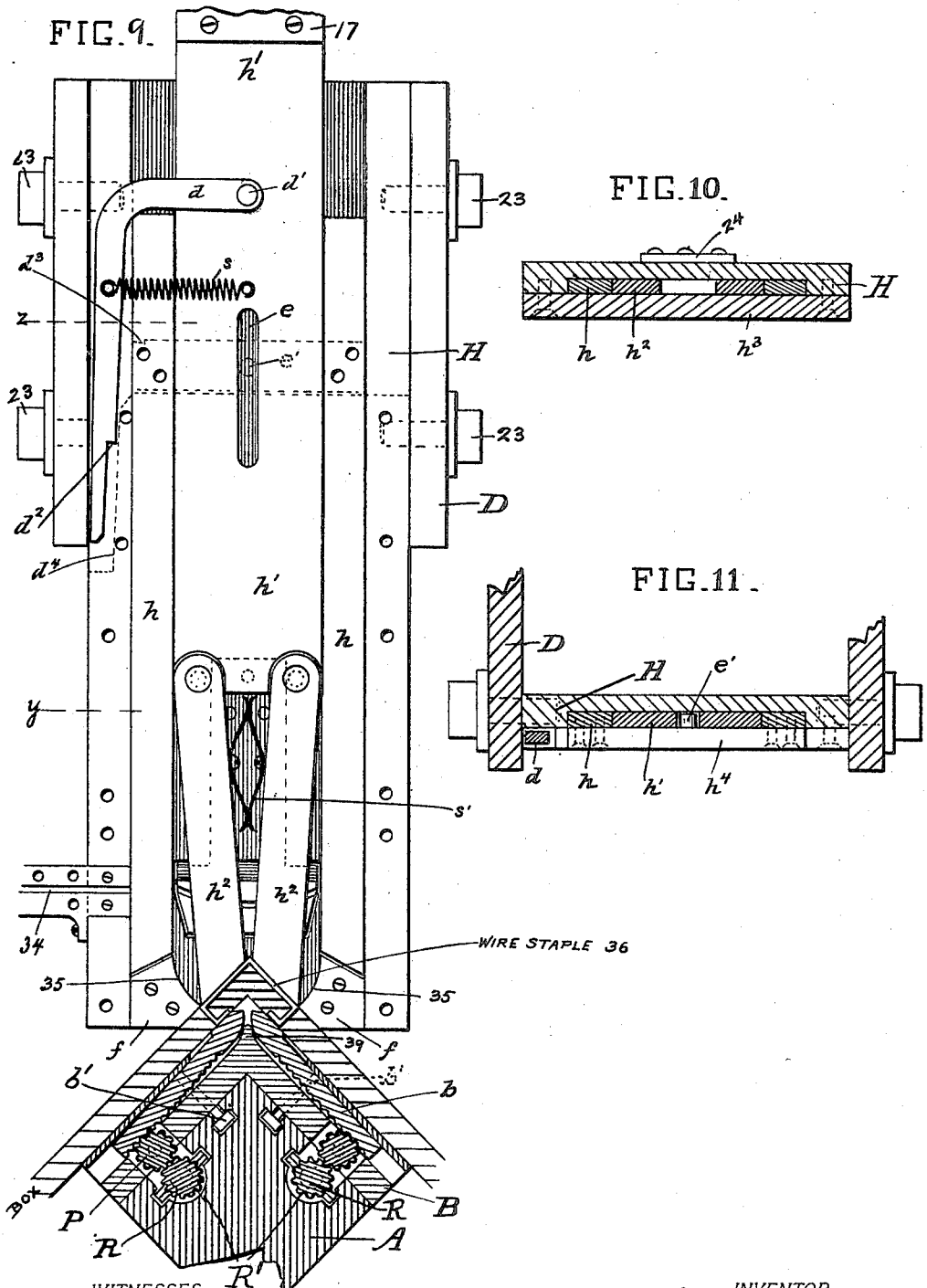

No. 678,815. Patented July 16, 1901.
J. SCHMIDT, Jr.
BOX STAPLING MACHINE.
(Application filed Apr. 4, 1900.)
(No Model.)
5 Sheets—Sheet 5.
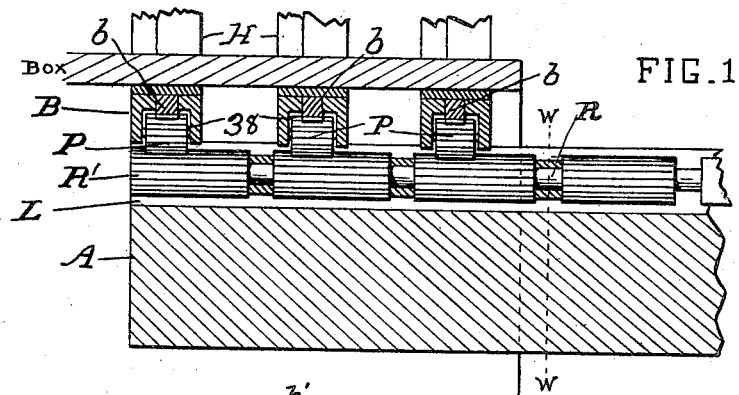
FIG. 12.
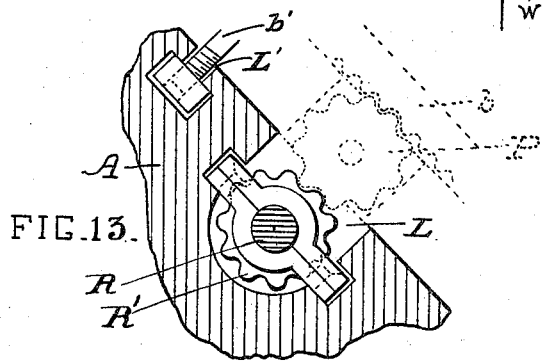
FIG. 13.
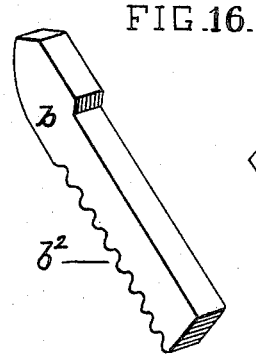
FIG. 16.
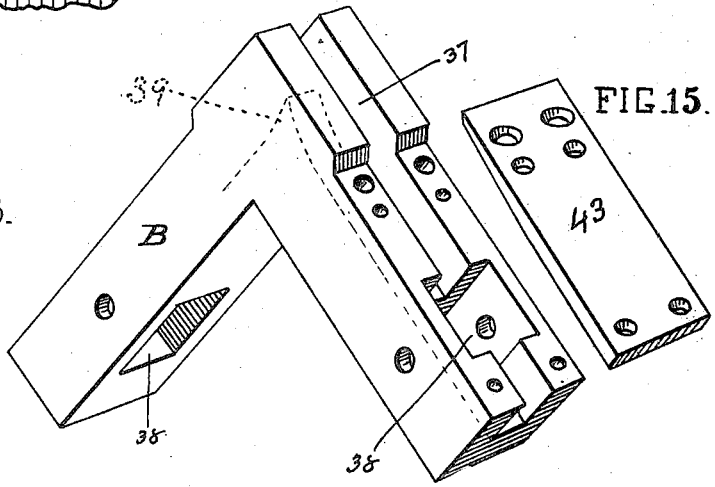
FIG. 14.
FIG. 15.
WITNESSES:
F. B. Townsend
H. D. Foley
INVENTOR
J. Schmidt Jr.
BY L. B. Coupland & Co.
ATTORNEYS
THE NORRIS PETERS CO., PHOTO-LITHO., WASHINGTON, D. C.

UNITED STATES PATENT OFFICE.

JOSEPH SCHMIDT, JR., OF CHICAGO, ILLINOIS, ASSIGNOR, BY MESNE ASSIGN-
MENTS, TO JOHN L. FLANNERY, OF SAME PLACE.

BOX-STAPLING MACHINE.

SPECIFICATION forming part of Letters Patent No. 678,815, dated July 16, 1901.

Application filed April 4, 1900. Serial No. 11,462. (No model.)

*To all whom it may concern:*

Be it known that I, JOSEPH SCHMIDT, Jr., a citizen of the United States, residing at Chicago, in the county of Cook and State of Illinois, have invented certain new and useful Improvements in Box-Stapling Machines; and I do hereby declare the following to be a full, clear, and exact description of the invention, such as will enable others skilled in the art to which it appertains to make and use the same.

This invention relates to improvements in that class of machines that are more especially designed for fastening together the corners of boxes and similar articles with wire staples, and has for its object to provide a machine of this character in which the operation of forming, driving, and clenching the staples is performed with facility, as will be hereinafter set forth in detail.

Figure 1 is a side elevation of a machine embodying the improved features. Fig. 2 is a plan of a bracket-support. Fig. 3 is a horizontal section on line $x\,x$, Fig. 1. Fig. 4 is a front elevation, the bracket supporting one end of the wire-feed shaft being broken away. Fig. 5 is a rear elevation with part of frame broken away. Fig. 6 is a detached rear elevation of clencher cam and connections. Fig. 7 is a broken-away front elevation showing details of one of the driving-heads, the face-plates being removed and the bracket supporting one end of the wire-feed shaft being omitted, and showing in dotted lines the relative position of the formers and drivers just after the wire is cut off and bent down over the anvil. Fig. 8 is a vertical central section of one of the forming and driving heads. Fig. 9 is a front elevation of a forming and driving head with face-plates removed and showing the relative position of the mechanism at the time of clenching the wire staples, the clenching mechanism and work-holding bed being shown in section. Fig. 10 is a horizontal transverse section on line $y\,y$, Figs. 7 and 9. Fig. 11 is a horizontal transverse section on line $z\,z$, Figs. 7 and 9. Fig. 12 is a longitudinal broken-away portion of the clencher mechanism. Fig. 13 is a vertical transverse section on line $w\,w$, Fig. 12. Fig. 14 is a view in perspective of the triangular frame in which the clencher-bars have their movement. Fig. 15 is a view of one of the removable cap-plates which retains the clencher-bars in place, and Fig. 16 is a view in perspective of one of the clencher-bars.

That part of the machine termed the "driving-head" carries the different elements for severing the wire as it is fed from the spool, imparting the required form to the staple and then forcing the same into place. Any number of heads, one or more, may be mounted in the same machine in accordance with the size of the box and the number of staples to be inserted in each corner. Each head only inserts one staple at a time; but in using a plurality of heads all the staples necessary to finish one corner of the receptacle are simultaneously inserted, the clenching mechanism being located on the work-holding bed.

The work-holding bed A presents two inclined surfaces corresponding to the corners of a box, and supports the work in the proper position to be operated upon, as shown in Figs. 4, 7, and 9, the work being shown in position and designated by the word "box" in the different figures or views. The rear end of the work-bed is bolted rigidly to the supporting-frame F.

A number of driving-heads is shown in connection with the machine; but a detailed description of one will answer for all, like reference characters being used on duplicate parts.

The driving-heads have a vertical reciprocating movement as a whole, and some of the operative parts carried thereby have an independent movement therein as each performs its particular function.

The main body part H of the driving-head is recessed or chambered on the front side, Figs. 10 and 11, for the reception of the staple forming and driving mechanism comprising the companion former-bars $h\,h$, having a vertical endwise movement, and the vertically-moving driving-bar $h'$, located between and flanked by the former-bars. The upper ends of a pair of driving-arms $h^2\,h^2$ are pivoted to the lower end of the driving-bar $h'$ and flanked by the companion former-bars $h\,h$. These parts are shown in their highest or normal position in Fig. 7 and in their opposite position in Fig. 9, the covering face-plate $h^3$ (shown in Figs. 4 and 10) being removed. The formers $h$ are connected by a transverse bar $h^4$ (shown in Figs. 4, 8, and 11) and its relative position indicated by dotted lines in Figs. 7 and 9. The bar $h^4$ is located on the front side of the driving-bar $h'$ and is provided with a pin $e'$, which loosely engages a vertical elongated slot $e$ in the driving-bar $h'$. The horizontal end of a downwardly-bent arm $d$ is pivoted to the driving-bar $h'$, as at $d'$. The lower part of the movable arm $d$ is disengaged and runs down along the outer edge of one of the former-bars and is provided with a shoulder $d^2$, which is adapted to engage with a recess $d^3$, formed in the upper edge and at one end of the transverse bar $h^4$, as shown in Fig. 4 and indicated by a dotted line in Fig. 9. The arm $d$ is shown in its highest or normal position in Fig. 7 and in its lowermost or opposite position in Fig. 9. In its normal position the shoulder $d^2$ of the arm $d$ engages the top edge of the bar $h^4$ and remains in engagement therewith on the down movement until the lower end of the arm $d$ comes in contact with the beveled cut-away edge $d^4$ of the face-plate $h^3$, as shown in Fig. 4 and indicated by dotted lines in Figs. 7 and 9, which has the effect of imparting a slight lateral movement to the arm $d$ and disengages the same from the bar $h^4$ and arrests the downward movement of the former-bars $h$ at the proper time. The transverse bar $h^4$ is also adapted to come to a stop on the upper end of the face-plate $h^3$. The function of the arm $d$ is therefore to take its movement from the vertical driving-bar $h'$ and in turn transmit it to the companion former-bars $h$, which are connected to move in unison by the transverse bar $h^4$. The spring $s$ serves to draw the arm $d$ back into engagement with the bar $h^4$ when returned to its normal position. On the up movement of the driving-bar $h'$ the bottom of the slot $e$ engages the pin $e'$ in the transverse bar $h^4$ and returns the former-bars to their highest or normal position. The upper end of the driving-bar $h'$ is connected to a clip 17, loosely mounted on a horizontal transverse rod T, as more particularly shown in Figs. 1 and 4. The clip 17 is longitudinally movable on its supporting-rod in spacing the driving-heads. The respective ends of the rod T are supported in a bracket 18, which is provided on one end with a sleeve 19, mounted on a vertical shaft N. The lower end of shaft N is attached to the upper end of a connecting-rod $c^2$, Figs. 1 and 4, the lower end of which is in turn connected to a crank-pin 20, inserted in the crank-wheel $C^2$, mounted on the inner end of the driving-shaft S. These connections transmit the required reciprocating movement to the driving-bar $h'$ in the driving head or heads and also to the companion former-bars through the medium of the bent movable arm $d$.

It will be understood that the driving head or heads proper do not travel as far as the driving-bar $h'$, but just far enough to permit of the insertion and removal of the work.

The mechanism employed in imparting a limited independent vertical movement to the driving head or heads and the means for supporting and the setting of the heads with reference to each other when a number is used will be next described.

A guide or bearing sleeve F' is loosely mounted on the vertical shaft N and is supported in a stationary position by a standard 21. This sleeve is loosely clamped on opposite sides by the rear ends of companion head-supporting plates D, Figs. 1 and 3. The rear ends of these plates are connected by a bracket D', to which in turn is properly connected the upper end of a connecting-rod K. The lower end of this rod connects with an eccentric ring C', loosely surrounding the cam-wheels $C^4$ and $c'$, mounted on the driving-shaft S, as shown in Fig. 5. The roller $r'$, journaled in the lower part of the eccentric ring C', has a rolling contact with the cam $c'$, and the roller $r^4$, journaled in the upper part of ring C', has a like contact with the cam $C^4$, and thus provides for the vertical reciprocating movement of the driving-heads and so timing the up-and-down movement of the heads as to bring the same in contact with the work at the proper time, as shown in Figs. 7 and 9. The plates D are provided longitudinally with slots O, through which are inserted clamping-bolts 23, engaging with the respective edges of the driving-heads and locking them in place. By loosening up on these bolts the heads may be moved along and set nearer to or farther away from each other, in accordance with the distance the staples are to be spaced apart in the work. In Fig. 1 two driving-heads are shown in position, and in Fig. 3 three are shown, but it will be noted that there is room for a greater number.

The driving-heads are provided with an anvil-block $a$, Figs. 1, 7, 8, and 9, inserted from the rear side and loosely retained in place by means of a spring-plate 24, to the lower end of which the anvil-block is secured, the upper end being fastened to the rear side of the head. The upper inner edge of this anvil is beveled, as at 25, so that the contact of the ends of the driving-arms will force the anvil back out of their path on the downstroke against the pressure of the suspending spring-plate 24. When the driving-arms have passed the anvil on the return stroke, the anvil is forced inwardly to its normal working position by the action of its spring-plate. The anvil is provided in its face with the wire-groove 26 for the reception of the wire to form the staple. The groove through the anvil is on a curve, so that the wire will bow downwardly, as shown in Fig. 7, to form good stiff driving-corners for the contact of the driving-arms. The downwardly-curved groove in the anvil will prevent the back of the staple from buckling or bending upwardly in the operation of forming, and produces a staple that is easier to drive and set up close in the work.

The mechanism for feeding the wire will be next described.

A feed-shaft 27 is supported in suitable bearings at one side of the frame in which the driving-heads are mounted. A wire-feed wheel E is mounted on this shaft in line with each of the driving-heads. Below the shaft 27 is located a gripping-shaft 28, on which is mounted a gripping-wheel E' in line with each of the feed-wheels E. The wire from which the staples are made is passed between the adjacent peripheries of the wheels E and E' in maintaining the required tension or gripping action in periodically feeding the wire into the driving-heads, as more particularly shown in Fig. 7. A bell-crank lever G is pivotally mounted at the junction of its two members on a pin 29 in a bracket 30, attached to the driving-head. The end of the upper member of the bell-crank G loosely engages the shaft 28. The lower end of the bell-crank forms a hand-grasp for throwing the gripping-wheels down out of engagement with reference to the wheel E when it is desired to stop the wire from feeding. A spring $s^3$ holds the bell-crank and the wheel E' up in its working position. A rack-bar $g$ is pivoted at its lower end and loose at the upper end and passes up through the handle end of the bell-crank lever and is adapted to lock and hold the wheel E' away from its working position against the pressure of the spring $s^3$. On the rear end of shaft 27, Figs. 3, 4, 5, and 7, is loosely mounted a movement-wheel $E^2$, having an intermittent rotary action. A ratchet-wheel Q is rigidly mounted on shaft 27 close to the wheel $E^2$. A pawl Q' is pivoted at one end to the wheel $E^2$, the loose end engaging the ratchet-wheel and being held in contact therewith by a spring $s^4$, Fig. 7. The upper end of a connecting feed-rod 1 is connected to the movement-wheel $E^2$, as at 31, Fig. 5. This rod is constructed in two parts and pivoted together, as at 32, forming an elbow-joint, and extends downwardly therefrom, the lower end being turned at right angles and having a joint connection on bearing-pin 33, joining the shaft N and the connecting-rod $c^2$. This connection imparts the necessary intermittent motion to the feed-shaft in feeding the wire in proper lengths through the medium of the pawl Q', engaging the ratchet-wheel Q and rotating the feed-shaft the distance of one notch in each revolution of the actuating-cam. The wire is fed in through a passage 34 in the side of the driving-heads and which is in line with the passage or groove in the anvil, as shown in Fig. 7. The relative position of the former-bars and driving-arms preparatory to the starting on the down-stroke is illustrated in Fig. 7, the length of the wire necessary to form a staple being in position to be operated upon, the feed-wheels being at rest. On the down movement the former-bar $h$ on the feed side also has the function of a cutter and severs the wire as the lower beveled end comes in contact therewith. Continuing the downward movement, the formers bend the ends of the wire extending from the respective edges of the anvil downwardly and inwardly and bring the ends inside of the line of the curve 35 of the guide and former plates $f$. Next the driving-arms come in contact with and force the anvil back out of their path, which has the effect of releasing the partly-finished staple from the groove therein, and as the ends of the driving-arms engage the staple the ends follow the curved bearing-surface of guide-plates $f$ and are bent at the right angle to be forced through the work, the terminal ends of the staple projecting through far enough to be operated upon by the clenching mechanism, which will be described farther along. The lower end of the driving-head comes in contact with and clamps the work in place before the down movement of the former-bars begins, the down movement of which is in turn arrested before the driving of the staple. The lower ends of the driving-arms are cut away on a bevel corresponding to that of the angle-corners of the work, so as to have a full bearing thereon, as shown in Fig. 9. The lower ends of the driving-arms on their down movement also come in contact with curved edge 35, which has the effect of forcing the same in the direction of each other until quite close together, so that the staple is set close in on the corner. On the return movement the arms are spread apart to their normal position by springs $s'$.

The clenching mechanism will be next described.

The work-bed is provided longitudinally in its sloping sides with grooves L, in which are journaled companion clencher-shafts R, on which barrel-pinions R' are mounted at intervals, as more particularly shown in Fig. 12. An angle clencher-frame B, Fig. 14, is provided for each driving-head and is mounted on the work-bed at intervals, Fig. 12, in line with the driving-heads. The angle-frame is movably secured in place by bolts $b'$, seated in grooves L' in the work-bed. The two legs of the angle-frame B straddling the work-bed are provided with recesses 38, in which are mounted pinions P, engaging the barrel-pinions R'. Each leg is also provided longitudinally in the upper side with a groove 37, in which the companion clencher-bars $b$ are loosely seated and are adapted to have a reciprocating endwise movement. The clencher-bars are provided along their under side with teeth $b^2$, with which the pinions P engage in actuating the same. These bars are set on an incline, the upper head ends being adapted to engage and clench the ends of the staples on the inside of the work. The contacting ends of the bars first present a beveled and then a flat surface to the ends of the staple to be clenched, as shown in Fig. 9, when the operation is complete. An angle wedge-point 39 is placed in the junction of the grooves 37, in which the clencher-bars have their endwise movement, and narrows the passage at this point, so that the head ends of the clencher-bars have a lateral wedging action as the flat surface thereof comes in contact with the ends of the staple and embeds the same in the work and leaves a perfectly smooth surface and guards against injuring the hands or the goods packed in the receptacles. A cam-wheel 40 is mounted on the driving-shaft S and is loosely surrounded by an eccentric ring $C^3$, to which is connected the lower end of a double connecting rack-bar or yoke M, the respective inner toothed edges of which are adapted to engage the two last pinions R on the companion clencher-shafts and rotate the same in actuating the clencher-bars at the proper time. The upper rod end of the double rack-bar is inserted loosely through a stationary guide-plate 41. A spiral spring $s^2$ is mounted on the rod end between the guide-plate and a tension-nut 42. A roller $r^3$ is journaled in the ring $C^3$, with which the projection $c^3$ on the cam-wheel 40 is adapted to have contact once in each revolution and periodically imparts a downward movement to the rack-bar M against the lifting power of the spring $s^2$ and rotates the companion clencher-shafts and moves the clencher-bars into the clenching position. (Shown in Fig. 9.) When the cam-wheel passes out of contact with its roller, the compressed lifting power of the spring $s^2$ returns the rack-bar to its upper normal position, which movement rotates the clencher-shafts in the opposite direction from that imparted by the down movement and returns the clencher-bars to their normal position. (Indicated by dotted lines in Fig. 7.)

The long barrel-pinions R' are used so as to provide for the lateral adjustment and spacing of the driving-heads.

The plate 43, Fig. 15, covers the groove 37 and retains the clencher-bars b loosely in their working position.

The driving-shaft S has the usual tight and loose pulleys mounted thereon and receives the necessary power from the motor.

Having thus described my invention, what I claim as new, and desire to secure by Letters Patent, is—

1. In a box-stapling machine, a driving-head, the companion former-bars, the driving-bar, means for actuating said driving-bar, the transverse bar, connecting the former-bars, and means for transmitting motion from the driving-bar to the former-bars, substantially as described.

2. In a box-stapling machine, the combination with a driving-bar, provided with a vertical elongated slot, of the companion former-bars, the transverse bar, connecting the former-bars and provided with a pin loosely engaging said slot, the movable arm, having one end pivoted to the driving-bar and provided with a shoulder loosely engaging said transverse bar, means for disengaging said arm at the proper time to arrest the down movement of the former-bars, means for returning said arm to its engaged position, and the operative connection with the driving-shaft, substantially as described.

3. In a box-stapling machine, the combination with a driving-head, of a driving-bar, mounted therein, the driving-arms, pivoted to the driving-bar, the companion former-bars, the operative connection, between the driving and former bars, a horizontal rod, a clip, movably connecting said rod and driving-bar, a bracket, provided at one end with a sleeve and supporting the respective ends of said rod, a vertical shaft on which the sleeve end of said bracket is mounted, and the operative connection between said vertical shaft and the driving-shaft, substantially as described.

4. In a box-stapling machine, the combination with a driving-head, of a driving-bar, mounted therein, the companion former-bars, a horizontal rod, a clip, connecting the driving-bar and rod, a bracket, provided at one end with a sleeve and supporting the respective ends of said rod, a vertical shaft on which the sleeve end of said bracket is mounted, a crank-wheel, the connecting-rod $c^2$, and the driving-shaft on which said crank-wheel is mounted, substantially as described.

5. In a box-stapling machine, the combination with a vertical shaft, N, of a guide-sleeve, loosely engaging said shaft, the companion head-supporting plates, a bracket, connecting the rear ends of said plates, the driving-head, movably mounted in said plates, and means for imparting an up-and-down movement thereto, substantially as described.

6. In a box-stapling machine, the combination with a vertical shaft N, of a guide-sleeve, loosely mounted thereon and supported in a stationary position, the companion plates, loosely engaging said sleeve at their rear ends, the bracket, connecting said plates, a connecting-rod, having its upper end engaging said bracket, an eccentric ring, to which the lower end of said rod is connected, the driving-shaft, the companion cam-wheels mounted thereon, and the rollers journaled in said eccentric ring and adapted to have an alternate intermittent contact with said cam-wheels, substantially as described.

7. In a box-stapling machine, the combination with a feed-shaft, of a feed-wheel, mounted thereon, a gripping-shaft, located below said feed-shaft, a gripping-wheel, mounted on the gripping-shaft in line with the feed-wheel and adapted to grip the wire in the operation of periodically feeding the same into the driving-heads, a bell-crank lever, loosely engaging the gripping-shaft, a spring for holding said gripping-shaft up to its working position, means for locking the same away from its working position, and the operative connections for transmitting an intermittent rotary movement to said feed-shaft.

8. In a box-stapling machine, the combination with the companion clencher-shafts, of the pinions, mounted thereon, the angle clencher-frame, the pinions mounted therein and engaging the pinions mounted on the clencher-shafts, the clencher-bars, having a reciprocating endwise movement, and the operative connection with the driving-shaft, substantially as described.

9. In a box-stapling machine, the combination with the work-bed, of the companion clencher-shafts, journaled therein, the pinions, mounted on said shafts, the clencher-frame mounted on the work-bed, the pinions, mounted in said frame and in position to be engaged by the pinions on the clencher-shafts, the clencher-bars, provided on the under side with a toothed surface engaged by the pinions in the clencher-frame in imparting a reciprocating endwise movement thereto, and the operative connection with the driving-shaft, substantially as described.

10. In a box-stapling machine, the combination with the work-bed, of the companion clencher-shafts, journaled therein the pinions mounted on said shafts, the clencher-frame, movably mounted on the work-bed, the pinions, mounted in said frame, the clencher-bars, a cam-wheel 40, mounted on the driving-shaft, an eccentric ring loosely surrounding said cam-wheel, the roller $r^3$, the double connecting rack-bar, and means for returning said rack-bar to its normal position, substantially as described.

In testimony whereof I affix my signature in presence of two witnesses.

JOSEPH SCHMIDT, JR.

Witnesses:
L. M. FREEMAN,
L. B. COUPLAND.